Figures 1, 2:
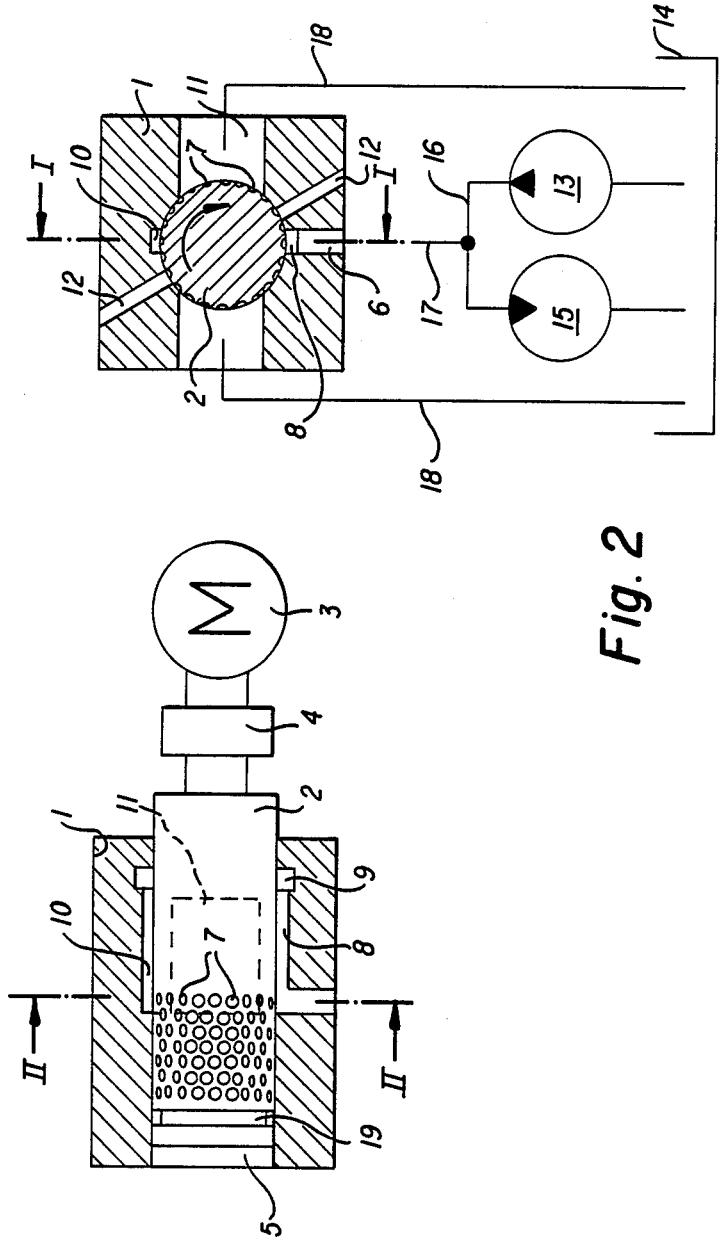

United States Patent [19]

Stein

[11] Patent Number: 4,821,515

[45] Date of Patent: Apr. 18, 1989

[54] CONTROL DEVICE FOR LIQUID OR GASEOUS MEDIUM

[76] Inventor: Günter Stein, Waihengeyerstr. 1, D 8882 Lauingen, Fed. Rep. of Germany

[21] Appl. No.: 165,186

[22] Filed: Mar. 7, 1988

Related U.S. Application Data

[63] Continuation of Ser. No. 915,861, Oct. 6, 1986, abandoned, which is a continuation of Ser. No. 600,667, Mar. 29, 1984, abandoned.

[51] Int. Cl.[4] .......................... G01F 11/22; F15B 15/18
[52] U.S. Cl. .................................... 60/494; 137/625.3; 415/90; 222/90
[58] Field of Search .................... 415/90; 222/305; 137/625.3; 60/494

[56] References Cited

U.S. PATENT DOCUMENTS

| | | |
|---|---|---|
| 2,322,866 | 6/1943 | Merz .............................. 222/305 X |
| 2,824,669 | 2/1958 | Grether . |
| 3,996,910 | 12/1976 | Noguchi et al. . |
| 4,378,195 | 3/1983 | Gamell .............................. 415/90 |

Primary Examiner—Arnold Rosenthal
Attorney, Agent, or Firm—Armstrong, Nikaido Marmelstein & Kubovcik

[57] ABSTRACT

There is proposed a volumetric control device acting on a liquid, a gas or an emulsion and comprising a rotary body arranged within a housing having openings. The rotary body is axially displaceable. The regulation of the volume results on one hand from the rotation speed of the body respectively of that of the housing and on the other hand from the axial displacement of the rotary body. Within a given time, according to the rotation speed, a different quantity will be metered and according to the axial position a different opening volume is used for the metering.

17 Claims, 6 Drawing Sheets

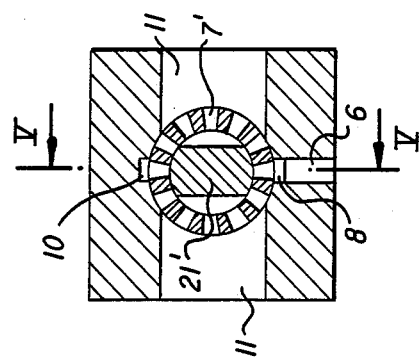
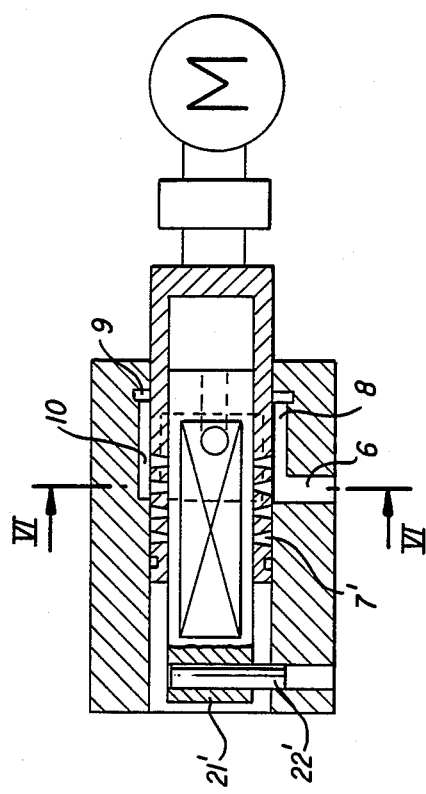

CONTROL DEVICE FOR LIQUID OR GASEOUS MEDIUM

This application is a continuation of Ser. No. 915,861, filed Oct. 6, 1986, now abandoned, which is a Rule 62 continuation of U.S. Ser. No. 600,667 filed Mar. 29, 1984, now abandoned.

STATUS OF THE PRIOR ART

The invention starts out from a device for the control of volume parts according to the species of the main claim. In the case of known devices of this type, customarily the passage from the inlet to the outlet of the housing is more or less opened or closed by the opening to the volume control, so that the volume control of the medium is pressure-dependent. Such devices have been known in many ways, whereby the opening as well as the outlets of the inlet and outlet may have the most diverse formation. The twisting of the control slide is accomplished by an adjusting motor or else by hand. In any case, in the case of these known devices, the volume control is achieved by a change of a cross section of passage. Such a control device is influenced strongly by the pressure and the temperature of the medium so that a precise volume control is not possible.

TASK OF THE INVENTION

As compared to that, the invention is based on the task of developing a control device for manifold possibilities of use in the case of which a determination of quantity or volume is achieved independently of the pressure and the temperature of the medium.

ADVANTAGES OF THE INVENTION

According to the invention this task is solved by the characterizing parts of the main claim with the advantages that, beside avoiding the disadvantages of the known control devices, in the case of standard operation, the inlet has no open connection to the outlet, so that the control slide during standstill blocks the passage. An additional essential advantage consists in the fact that the opening makes possible an exact dosing of the medium by the delivery of a calibrated quantity determined by the opening volume after continued turning from the inlet to the outlet. As a result of the fact that, as long as the inlet is connected with the opening, the outlet has no connection to the same opening and no direct connection between inlet and outlet exists, this control device operates largely independently of the height of the inlet pressure so that it is suitable equally well as a volume control for small, great or especially varying pressures. Since any losses of heat or leakage hardly develop, an extraordinarily high degree of effectiveness may be achieved additionally.

On the basis of the possibility of inserting the control arrangement directly into the stream of media or into a branching of it, it may also be used as a pressure control valve or pressure reduction valve. In one case, the continuing flow quantity which is determined by the rpm and the axial position of the rotary slide, determines the pressure and in the other case, the branched off quantity. This is particularly true for gaseous media.

Since in the case of liquid media or emulsions, gas or air cushions are formed under the medium, as a result of that the "ejection" of the medium from the opening is enhanced and accelerated. The fluid during the filling up of the openings does indeed compress the gases still located in those dead end openings corresponding to the liquid pressure on the inlet side.

In the case of the use of the control arrangement for liquids as medium, the naturally available adhesion force of the liquid may be used for facilitating the exit of the liquid from the openings. As a result of a "soft" transition to the outlet opening in the bore of the housing accommodating the rotary slide, even prior to a full control of the exist, the enclosed quantity of liquid is put in motion in the direction of the outlet.

According to the invention, a large number of openings may be provided which then may be disposed in the most diverse manner on the control surface of the control slide. Thus, for example, they may be in rows lying side by side whereby the openings may again be displaced in relation to one another. It is also possible to develop the openings as blind bores with variable depth so that the controlled quantity also changes depending on the length of the blind bore located in the insert. A change of the length of the hole distributed over the length of the rotary slide produces a change in quantity in the case of axial shifting of the slide so that inlets and outlets for the medium may always be connected with the inlets to the hole.

Quantity controls may also be accomplished by twisting or axially shifting the housing. This may be required, whenever the rotary slide is coupled rigidly with an axially not shiftable axle, for example, in the case of the use of injection pumps.

Depending on the development of the control slide, for example, whether it is developed as a piston slide, hollow slide with torsional core or as a flat slide with frontal control, the openings moreover may be developed variably. Thus, short blind bores or cavities may serve as openings, especially whenever the control is accomplished on a surface of the control slide, however they may also be breakthroughs, whenever the control is possible bilaterally.

According to an additional development of the invention, the control slide or else other control organs, such as the core or an annular slide disposed around the control slide, is axially shiftable in order thus to have an additional possibility of engagement with the volume control. As a result of that the quantity may be influenced by using a variable number of openings for the control, however, a shutting off of the proportioning may also be accomplished without, because of that, preventing the control slide from continuing to rotate. The axial shifting of these control organs may be accomplished hydraulically, for example, by deflected quantities in the manner of a control.

According to a further development of the invention, always two inlets or outlets are arranged on mutually opposite sides of the control slide for the compensation of the radial or axial forces engaging at the control slide. These channels assigned to one another are preferably connected with one another.

A preferred position of insertion may be a perpendicular arrangement of the axle. In this case, the ventilation of the installation "upward" from out of the rotary gap will be ensured, and it will be possible in a simple manner to achieve by way of a wedged groove a lubrication from above into the opening gap, especially in the case of gaseous media.

In the case of the overwhelming number of the possible embodiments of the invention, inlet and outlet are exchangeable. As a result of that, a great degree of freedom develops concerning the position of insertion of the housing.

However, it is conceivable that several control circuits may be capable of being switched on, whereby they control the same openings one after the other in the case of two inlets and outlets, or whereby several control planes are provided side by side. Such several control circuits, in turn, may be connected with one another, for example, in the manner of a step switching and whenever particularly variable volumes are to be controlled.

Thus, it is also possible to use the invention in the case of injection installations in order therewith to deduce an intended quantity of the injection volume, for example, in order to achieve an extension of the duration of injection. In such a case, the injection pump regulator replaces the quantity needed by the motor and deduced as a result of the object of the invention so that the motor runs more softly.

As a result of the use of a preceding pressure maintaining valve (cluck valve) and for avoiding undesirable changes of the start of spraying, a beginning of the injection will be achieved before the control arrangement for the production of a change in the duration of injection becomes active. The possibilities of use of the control arrangement according to the invention are extremely great. Thus, this control arrangement may not only serve as a dosing apparatus or as a quantity control device, but also for example as a control device for a refrigerator for the expansion of gas without thereby producing an open connection. Another possibility of application consists in the wide area of the underpressure control.

Additional advantages may be gathered from the subsequent description of the figures as well as from the claims.

DRAWING

Figure 4:
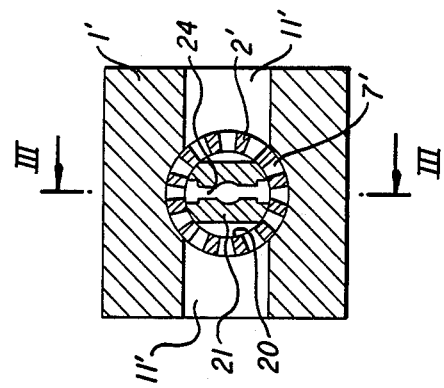
Figure 3:
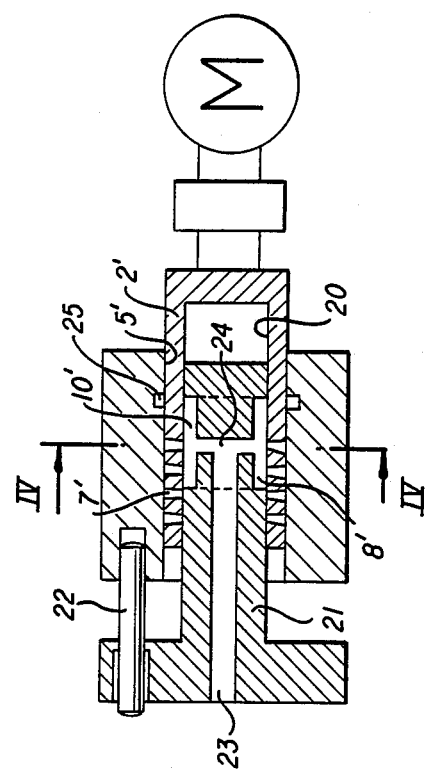
Figure 7:
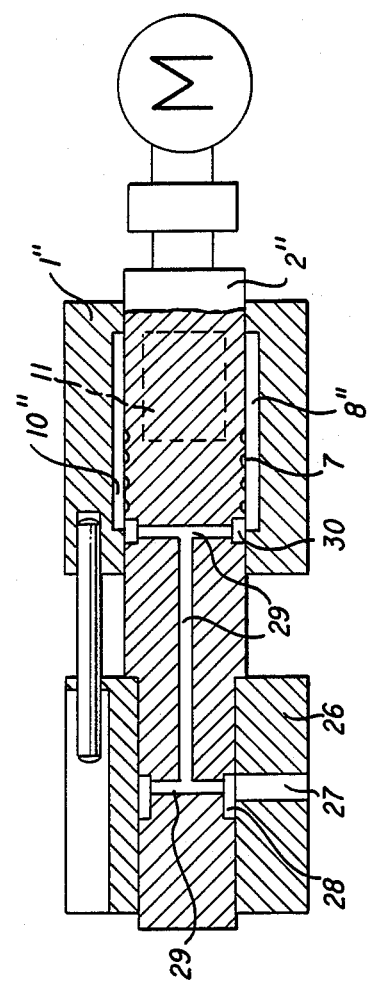
Figure 10:
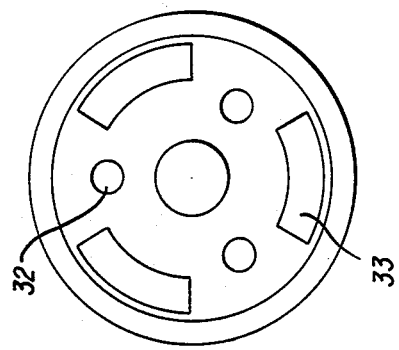
Figure 8:
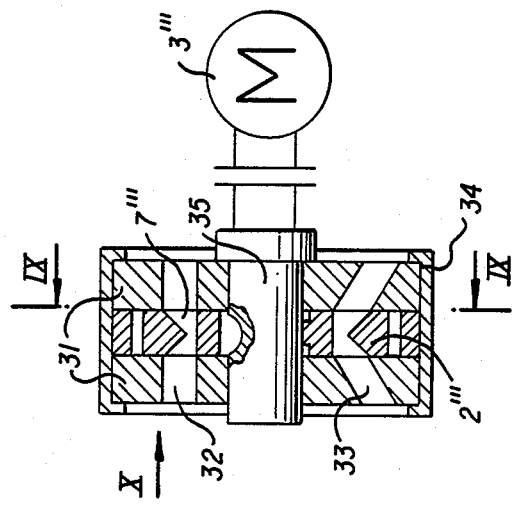
Figure 9:
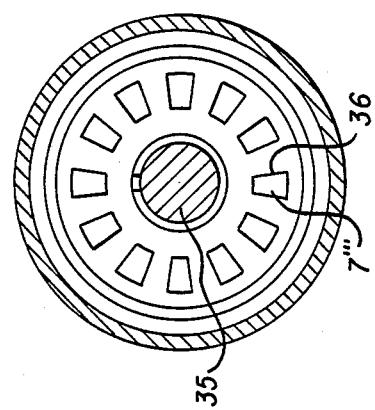

Five embodiments by way of example of the object of the invention are shown in the drawing and are described in more detail in the following paragraphs:

FIG. 1 shows the first embodiment in partial longitudinal cut according to the cut 1—1 in FIG. 2, FIG. 2 shows a cut following the line 2—2 in FIG. 1, FIG. 3 shows the second embodiment by way of example in longitudinal cut according to the line 3—3 in FIG. 4, FIG. 4 shows a cut according to the line 4—4 in FIG. 3, FIG. 5 is a variation of the second embodiment by way of example in longitudinal cut according to the line 5—5 in FIG. 6, FIG. 6 shows a cut according to the line 6—6 in FIG. 5, FIG. 7 shows the third embodiment by way of example in longitudinal cut, FIG. 8 shows the fourth embodiment in longintudinal cut, FIG. 9 shows a view in cut according to the line 9—9 in FIG. 8, FIG. 10 shows a view according to the arrow 10 in FIG. 8 and FIGS. 11-13 shows an additional practical embodiment by way of example.

DESCRIPTION OF THE EXAMPLES OF THE INVENTION

In the FIGS. 1 and 2, a first embodiment of the invention is shown by way of example in the case of which a control slide 2 is mounted rotatably as well as axially shiftably in a housing 1. The control slide 2 is driven rotatingly by a motor 3 by way of a coupling 4 which permits an axial shifting of the control slide.

The control slide 2 operates in a bore 5 of the housing, into which an inlet channel 6 leads at right angle. On the jacket surface of the control slide 2, at least opposite this outlet, grooveshaped dead end openings 7 have been provided which are disposed in a large number in parallel rows. In this case, the individual bores viewed per row are displaced against each other. A longitudinal groove 8 in the wall of the bore 5 branches off the inlet channel 6 which bore is connected by way of an annular groove 9 with a second longitudinal groove 10 which is diametrically opposed to the longitudinal groove 8. A compensation of the hydraulic forces attacking on the control slide 2 will be achieved by way of this longitudinal groove.

Recesses 11 in the housing 1 serve as an outlet channel, which recesses likewise are diametrically opposed to one another and at the same time cover up a considerably larger number of openings 7 than the longitudinal grooves 8 and 10. Moreover, an additional channel 12 is also provided in the housing 1 which may serve either for the prefilling of the blind bores or for a ventilation. In the first case it is connected with the inlet channel, in the second case with the release channel.

In this first example, the control arrangement is shown used in the case of a hydraulic gearing. A pump 13 sucks the hydraulic fluid from a container 14 and pumps it to a hydraulic motor 15. Depending on how much of the hydraulic fluid is branched off by way of the control arrangement, the rpm of the motor 15 may be changed. The feed line 17 to the housing 1 of the control arrangement branches off the connecting line 16 between the hydraulic pump 13 and the motor 15. Consequently, the pressure which also exists in the connecting line 16 prevails in the longitudinal grooves 8 and 10 of the control arrangement. By way of these two longitudinal grooves 8 and 10, the part of the openings 7 is filled with hydraulic fluid which happens to be opposite these grooves. In case of continuing to turn the control slide 2 (in the direction of the arrow) after a certain twisting, these filled up openings arrive in cover-up position with the outlet channels 11. On the basis of the centrifugal force, the medium is hurled into these outlets so that in the case of continued turning and as soon as they lie opposite the grooves 8 and 10, they will be capable of filling again. As a result of the additional channels 12, as has already been described further above, one will achieve that depending on the type of connection of these additional channels 12, either residual quantities will empty out of the opening 7 or a prefilling of them occurs. In each case, a quantity of hydraulic aggregate 13, 15, 16 corresponding to their volume will be branched off from each opening 7 and will be fed by way of outlet channels 11 as well as reversals 18 to the tank 14.

Depending on the axial position of the control slide 2, several rows of the opening 7 are in cover-up position with the longitudinal grooves 8 and 10. Corresponding to the number of openings, the branched off hydraulic quantity is also variable. In this manner, a change of the branched off volume is very easily possible. In the case of an extreme shifting of the control slide 2, a short circuit between the longitudinal grooves 8 and 10, as well as the exit channels 11 may be achieved by way of an annular groove 19 disposed on the slide 2, that is to say that, despite the rotation of the slide 2, the entire conveyed quantity of the pump 13 may flow off without being used. In the other extreme position of the control slide 2, no openings will be in cover-up position with the longitudinal grooves 8 and 10 so that the entire quantity conveyed by the pump reaches the motor 15, i.e., that the latter runs at maximum rpm.

In the case of the additional development by way of example described in the following paragraphs, the parts corresponding to the first embodiment by way of example are given the same reference numbers which merely have an index as a difference.

In the case of the second embodiment given by way of example shown in the FIGS. 3 to 6 in two variations, the control slide 2' is developed as a hollow slide which, in its inside bore 20, accommodates a torsional core 21. This core 21 is axially shiftable and is secured by way of a peg 22 against rotating along. The core 21 has a central bore 23 for the inlet of the control medium, which bore is connected by way of a transverse bore 24 with longitudinal grooves 8' and 10'. In this case, radial perforations 7' serve as openings in the wall of the hollow slide 2'. As outlet channels and similarly as in the case of the first embodiment given by way of example, recesses 11' will serve into which, as a result of the centrifugal force, the control medium is hurled from the openings 7'. For this purpose, the openings 7' have been developed preferably slightly conically toward the outside.

In the bore 5' of the housing 1' accommodating the slide 2', an annular groove 25 has been provided, which in the case of a corresponding axial shifting of the slide 2' comes into a cover-up position with the openings 7' as a result of which a short circuit develops by way of these.

In the case of the variation shown in FIGS. 5 and 6 of this second embodiment by way of example, the core 21' is additionally secured by way of the peg 22' against an axial shifting. As in the case of the first embodiment by way of example, in this case the access of the control medium is accomplished via a radial bore 6, longitudinal grooves 8 and 10 as well as an annular groove 9. The medium outflow likewise takes place by way of the recesses 11 in the housing 1 which, except for the mounting of the peg 22', is developed as in the case of the first embodiment given by way of example.

The embodiment shown in FIG. 7 is shaped particularly for use with injection installations. By branching off of a certain quantity during the conveying process of the injection pump, in the case of which the temporal conveyance as such is determined, depending on the rpm, the duration of injection is prolonged and thus a soft running of the motor will be achieved. The slide 2'' disposed in the housing 1'' is developed in the form of steps and accommodates an annular slide 26 on the section with the smaller diameter. The inlet of the fuel takes place by way of a radial bore 27 in the slide 26, the mouth of which lies opposite to an annular groove 28 in the slide 2''. The fuel reaches an annular groove 30 in the jacket surface of the section with the greater diameter via bores 29 in the slide 2''. From this annular groove, the fuel then reaches the longitudinal grooves 8'' and 10'', which may come into a cover-up position with the dead end openings 7. The recesses 11 again serve as an outlet, as in the case of the first embodiment by way of example. By changing the cover up position between the dead end openings 7 and the exit recesses 11, the outflowing quantity is determined. This cover-up is accomplished in accordance with the requirements of the injection law. Instead of the annular slide 26, the housing of an injection pump may be put.

In the FIGS. 8, 9 and 10, the fourth embodiment by way of example is shown, in the case of which a flat slide 2''' serves as a control slide in the case of which openings 7'''' are open toward the front surfaces of the control slide. The control slide 2''' runs between two housing plates 31, which also accommodate the inlet channels 32 as well as the outlet channels 33. The entire construction is symmetrical in the direction toward the flat slide 2'''. The plates are held together by way of a housing 34. The drive is accomplished by way of a shaft 35 which is driven by the motor 3'''.

The openings 7'''' penetrate the flat slide 2''' and they have a constriction toward the middle in such a way that from the outside in the direction toward the shaft 35, a key-in exists. As a result of that one will achieve that for the exit of the medium based on the centrifugal forces, more favorable flow conditions will be achieved. The opening cross section 36 of the openings 7'''' is in a trapezoidal form, expending toward the outisde (FIG. 9).

In the case of this embodiment given by way of example, with a turn of the flat slide, an inlet or outlet will be achieved several times in succession. As is apparent from FIG. 10, inlets 32 and outlets 33 are disposed three times in succession, whereby the inlets 32 are developed as bores, whereas the outlets 33 are developed as annular sections.

In the case of this fourth embodiment given by way of example, it will be possible to accomplish such successive connections with corresponding division also in the case of other embodiments given by way of example.

The axial shifting of the control slide may take place manually or automatically. Thus, it is conceivable that a front side control surface of the control slide is acted upon by a control medium, as a result of which the axial shifting of the control slide is governed by the pressure of the medium or the quantity, and thus some kind of regulation develops. In each case, the invention may be constructed in the most diverse variations, as a result of which an extraordinarily wide possibility of application is given. The preferred use is naturally with nearly incompressible media, such as for example, hydraulic fluid, fuel, liquid medications etc. However, the use may also be for gases by adding them before the inlet and by letting them flow out again to a large extent at the outlet in a stress-relieved condition. Thus, the application is also absolutely possible with refrigeration and air-conditioning devices.

Figure 11:
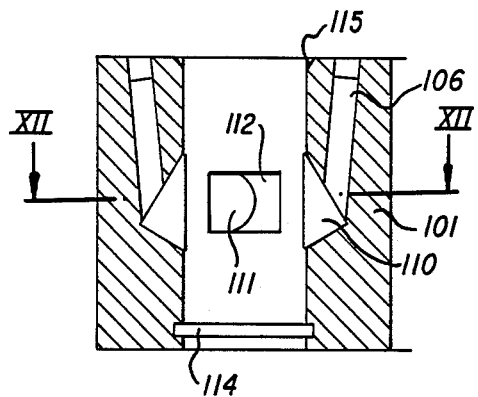
Figure 12:
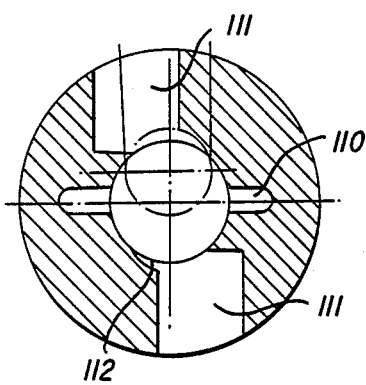
Figure 13:
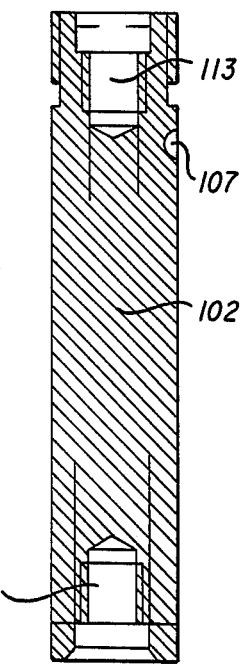

In the case of the fifth embodiment given by way of example and described in the FIGS. 11 to 13, we are dealing with a device that may be used practically in injection engineering. In the case of this example, in FIG. 11, the housing is shown in longitudinal section, in FIG. 12 in cross section according to the line 12—12 from FIG. 11, and in FIG. 13 the rotary slide is shown in longitudinal section. The fuel reaches the rotary slide 102 by way of inlet channels 106 in the housing 101 which rotary slide here is shown in a disassembled state in FIG. 13. The fuel then reaches the openings 107 in the rotary slide 102 by way of the longitudinal groove 110 which is part of the feed channel 106, said openings here are only indicated to have variable depth, namely in the upper part of the rotary slide 102 shown in FIG. 13, they are deeper than in the lower part and to be sure with an even transition. As a result of that and depending on the axial position of the rotary slide 102, there is a variably deep group of dead end openings 107 as compared to the grooves 110. That is to say the quantity of fuel received from the grooves 110 is also variably great. The outlet channel 111, just like the inlet channel, is symmetrically disposed in relation to the axis of the entire device in order thereby to act in a force-compensating manner in a radial direction. Before the openings 107 are opened by the outlet channel 111, the control place has already been "enlarged" by a flatly rising pre-groove 112 as a result of which beside the centrifugal force as well as the driving forces of enclosed quantities of air, the adhesion force also promotes the release of the quantities of fuel located in the opening. As a result of the gradual removal of the wall of the housing enclosing the rotary slide 102, the adhesion film will only be torn off gradually and prior to that will cause a suction effect.

Threaded bores 113 are provided at the ends on the rotary slide 102, in order to have an engagement for the axial operation of said slide.

As shown in FIG. 11, in the housing in the inside bore accommodating the rotary slide 102, an annular groove 114 has been provided in order therewith to stop the flowing out of the fuel. In addition, a phase 117 has been provided in the upper area of the housing on this inside bore, which together with the rotary slide 102 forms a funnelshaped annular groove which may be used for the lubrication in the case of little self-lubricating fuels. In addition, this annular groove 115 may serve for the ventilation of the gas collecting in the gap between the rotary slide 102 and the housing 101.

In the case of an axial shifting of the rotary slide 102, openings 107 are always opposite the longitudinal grooves 110, so that the control quantity is changeable on the one hand by the rpm of the rotary slide 102 and on the other hand by the axial position. Whenever for example the rotary slide 102 is coupled directly with the axis of an injection pump and thus an axial shifting is not possible, it will be possible also according to the invention to shift the housing 101 for the purpose of changing the quantity. The basic value for the control will then result from the rpm given by the injection pump against the additional control adaptable to the characteristic values of the motor by axial shifting of the housing 101.

I claim:
1. Control arrangement for controlling parts of volume of a liquid medium, a gaseous medium or an emulsion medium under pressure, said control arrangement comprising:
   a housing, including an inlet and an outlet for said medium;
   a cylindrical volume control slide mounted in said housing, and drivable rotatably in said housing with a predetermined rpm, said control slide having a control surface;
   at least one opening means provided in said control surface, said at least one opening means being connectable during rotation of said control slide in said housing alternately with said inlet and said outlet for receiving medium at said inlet and for ejecting medium at said outlet;
   a pumping means connected to a medium actuated means by a connection line for pumping said medium to said medium actuated means;
   a branch line connecting said connection line with said inlet of said housing;
   said cylindrical volume control slide and said housing being pressure tight so that, in use of said arrangement, medium entering said inlet from said branch line undergoes a pressure drop between said inlet and said outlet, said medium compressing gaseous parts in said at least one opening means, said medium being ejected from said opening means at said outlet under the effect of centrifugal force.

2. Arrangement according to claim 1, wherein said opening means is composed of openings disposed in several rows side by side on said control surface of said control slide.

3. Arrangement according to claim 2, wherein said openings are disposed in two rows lying side by side displaced in relation to one another in a direction of control.

4. Arrangement according to claim 1, wherein said medium is fed to said control slide and thus to said at least one opening means by way of at least two inlet channels and is conducted away by way of two outlet channels.

5. Arrangement according to claim 4, wherein two inlet channels or outlet channels are located opposite one another in relation to said control slide in order to compensate for the forces of said medium engaging at said control slide.

6. Arrangement according to claim 5, wherein said two inlet channels are interconnected by a short circuit channel.

7. Arrangement according to claim 1, wherein said inlet and outlet channels cooperate with said opening means by means of annular or longitudinal grooves, the open sides of which may be crossed by said opening means.

8. Arrangement according to claim 1, wherein said opening means prior to communicating with said inlet or said outlet communicate with a channel for supply of medium or ventilation.

9. Arrangement according to claim 1 wherein said inlet can function as an outlet and said outlet can function as an inlet.

10. Arrangement according to claim 1, wherein said at least one opening means is characterized by a short, blind bore or cavity.

11. Arrangement according to claim 1, wherein said opening means is disposed in a wall of said control slide.

12. Arrangement according to claim 11, wherein said control slide is axially shiftable.

13. Arrangement according to claim 11, wherein at least one annular groove is disposed in said control surface as a result of which an additional control is obtained after axial shifting of said slide by short circuiting of said inlet and outlet.

14. Arrangement according to claim 11, wherein said control slide may be acted upon on a front side by a controlled pressure and is axially shiftable for regulation.

15. Arrangement according to claim 1, wherein said opening means are blind holes.

16. Arrangement according to claim 1, wherein said control slide is intermittently axially displaceable for controlling communication between said at least one opening means and said inlet channels and outlet channels.

17. Arrangement according to claim 1, wherein said control slide is disposed horizontally.

* * * * *